United States Patent
Lin

(10) Patent No.: US 8,433,933 B2
(45) Date of Patent: Apr. 30, 2013

(54) COMPUTER DEVICE AND IMAGE CAPTURER

(75) Inventor: Wei-Po Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 446 days.

(21) Appl. No.: 12/696,034

(22) Filed: Jan. 28, 2010

(65) Prior Publication Data

US 2010/0205465 A1 Aug. 12, 2010

(30) Foreign Application Priority Data

Feb. 9, 2009 (TW) .............................. 98104030 A

(51) Int. Cl.
*G06F 1/26* (2006.01)

(52) U.S. Cl.
USPC .......................................................... 713/300

(58) Field of Classification Search .................... 713/300
See application file for complete search history.

(56) References Cited

U.S. PATENT DOCUMENTS

| | | | | |
|---|---|---|---|---|
| 5,884,086 A | * | 3/1999 | Amoni et al. ................. | 713/300 |
| 6,002,508 A | * | 12/1999 | Mai .............................. | 359/212.1 |
| 6,003,138 A | * | 12/1999 | Chung .......................... | 713/300 |
| 7,138,854 B2 | * | 11/2006 | Messager ...................... | 327/539 |
| 7,908,414 B2 | * | 3/2011 | Combs et al. .................. | 710/62 |

FOREIGN PATENT DOCUMENTS

CN 1852439 10/2006

OTHER PUBLICATIONS

"First Office Action of China Counterpart Application", issued on Feb. 23, 2011, p. 1-p. 6.

* cited by examiner

*Primary Examiner* — Kim Huynh
*Assistant Examiner* — Eric Chang
(74) *Attorney, Agent, or Firm* — Jianq Chyun IP Office

(57) ABSTRACT

A computer device includes a controller, a power supply circuit and a universal serial bus (USB) module. The controller is used for transmitting a data signal. The power supply circuit is used for supplying operating power. The USB module includes a USB bridge and a core circuit. The USB bridge is used for transmitting the data signal, and it operates according to the operating power generated by the power supply circuit. The core circuit operates according to the operating power generated by the power supply circuit.

9 Claims, 3 Drawing Sheets

COMPUTER DEVICE AND IMAGE CAPTURER

CROSS-REFERENCE TO RELATED APPLICATION

This application claims the priority benefit of Taiwan application serial no. 98104030, filed on Feb. 9, 2009. The entirety of the above-mentioned patent application is hereby incorporated by reference herein and made a part of specification.

BACKGROUND OF THE INVENTION

1. Field of the Invention

The invention relates to a computer device and, more particularly, to a computer device with a built-in universal serial bus (USB) device.

2. Background of the Invention

With the progress of the digital science and technology, the personal computer becomes an essential electronic product for people. Therefore, many consumer electronic products such as digital cameras and mobile phones provide interfaces for being connected with personal computers to allow users to increase the functions of the products via the strong functions of the personal computers. To achieve this objective easily and conveniently, a plug and play (PNP) USB interface is introduced.

To popularize the USB, USB Implementers Forum (USBIF) establishes many related specifications to make the USB available for many electronic devices under the same specification. In the aspect of the operating power, since many integrated circuits are designed to operate at 5 volts when the specification is established, the interface operating power of the USB device is also defined to be 5 volts.

However, no power supply circuit supplying 5-volt output power exists in the personal computer system. Thus, some voltage regulators are designed to solve the problem.

FIG. 1 is a block diagram showing a conventional connected built-in USB digital camera. The digital camera 110 includes an image sensor 111, a USB bridge 112, a voltage regulator 113 and a lens 114. The USB bridge 112 is coupled to a controller 121 on a conventional motherboard via a USB B1, and it also is coupled to the image sensor 111 and the voltage regulator 113. In addition, the image sensor 111 may be disposed on the transmitting path of light passing the lens 114 to capture outside images.

In the conventional technology, since the image sensor 111 (such as a complementary metal oxide semiconductor (CMOS) sensor of a camera in a notebook computer) in the digital camera 110 and the USB bridge 112 need 3.3-volt operating power to operate, a power supply circuit 124 and a power supply circuit 125 are used to provide 19-volt operating power and 3.3-volt operating power, respectively. Furthermore, as stated above, the interface operating power of the USB device is defined to be 5 volts. Therefore, in the conventional technology, a voltage regulator 123 only may be used to reduce the 19-volt power generated by the power supply circuit 124 to 5-volt interface voltage, and then a voltage regulator 113 adjusts the 5-volt interface voltage to be 3.3-volt operating power of the image sensor 111 and the USB bridge 112.

Although the power supply circuit 125 which may provide 3.3-volt power is disposed in the computer system, it cannot be used directly, and the voltage regulator 123 and the voltage regulator 14 are used additionally, which is a waste of costs. Moreover, when the voltage regulator converts the voltage, it consumes power and wastes electricity.

BRIEF SUMMARY OF THE INVENTION

The invention provides a computer device whose built-in device using the existing power signal in the computer device as the system power thereof directly, and an additional voltage regulator is not needed.

The invention further provides an image capturer adapted for a computer device. The image capturer does not use the power supplied by the USB, and therefore, no additional voltage regulator is needed.

The invention provides a computer device including a controller, a power supply circuit and a USB module. The controller is used for transmitting a data signal. The power supply circuit is used for supplying operating power, and the voltage level of the operating power is different from the voltage level of the power pin set. The USB module includes a USB bridge and a core circuit. The USB bridge is coupled to the USB module and directly connected to the power supply circuit, and it is used for transmitting the data signal and operating according to the operating power generated by the power supply circuit. The core circuit is coupled to the USB module and directly connected to the power supply circuit, and it operates according to the operating power generated by the power supply circuit.

The invention further provides an image capturer adapted for a computer device. The image capturer includes a USB bridge, a power line and an image sensing module. The USB bridge is coupled to the USB and used for transmitting data signal. The power line is used for directly receiving operating power from the computer device. The image sensing module is coupled to the USB bridge and used for transmitting the data signal and receiving the operating power via the power line. The USB bridge and image sensing module receive the operating power and operate according to the operating power.

The built-in USB device is not limited by the voltage level of the operating power in the USB specification in the invention, and the existing power supply circuit in the computer device is further utilized to provide operating power for the USB device to make it operate normally. Therefore, the operating power may be directly provided for the built-in USB device in the computer device, and an additional voltage regulator is not needed.

These and other features, aspects, and advantages of the present invention will become better understood with regard to the following description, appended claims, and accompanying drawings.

DETAILED DESCRIPTION OF THE EMBODIMENTS

The embodiments of the computer device with a built-in USB device according to the invention are illustrated with the accompanying drawings to allow persons having ordinary skill in the art may implement the invention.

Figure 1:
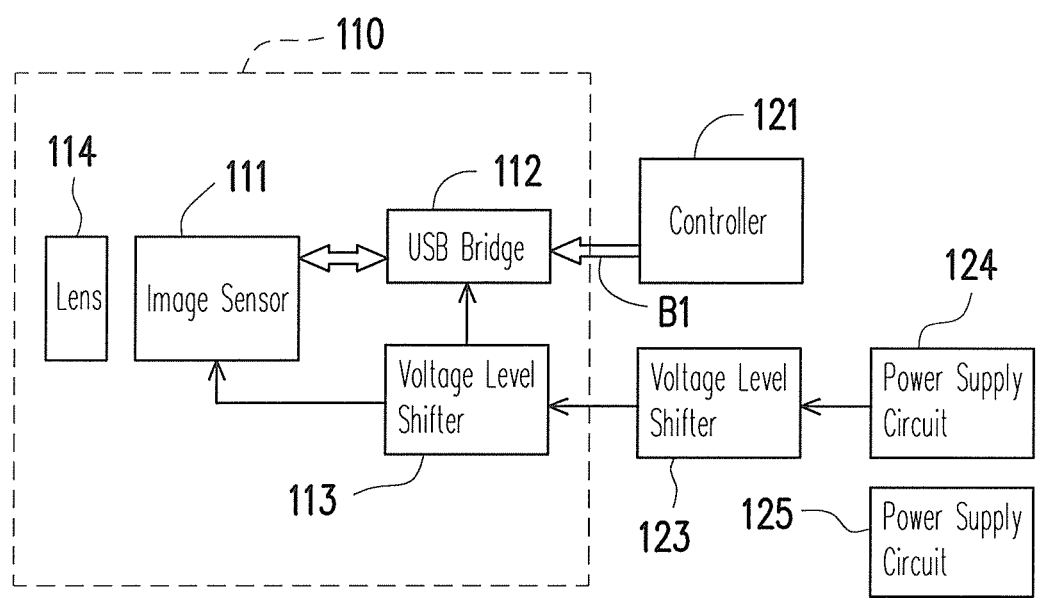
FIG. 1 is a block diagram showing a conventional connected built-in USB digital camera.
Figure 2:
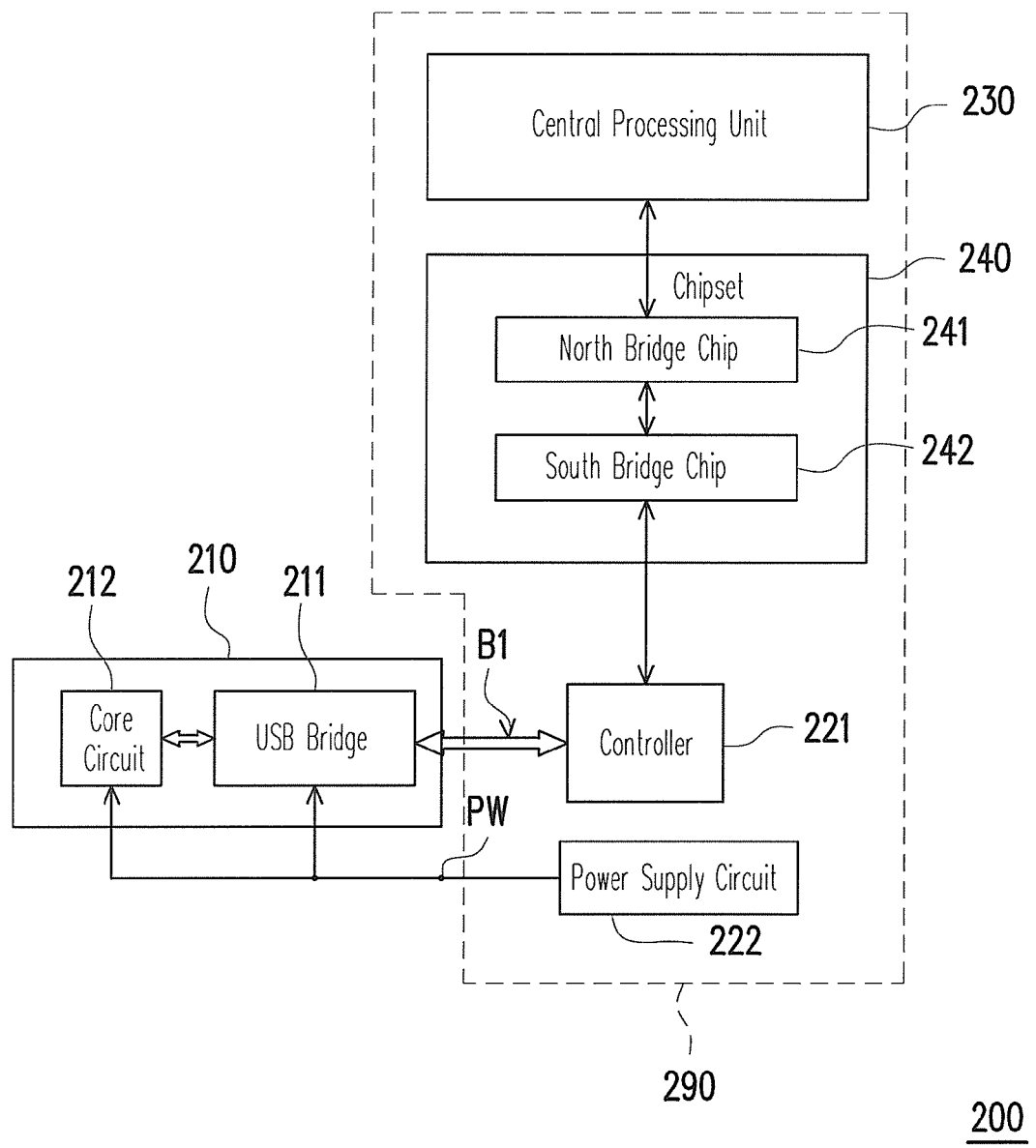
FIG. 2 is a block diagram showing a computer device according to an embodiment of the invention.

FIG. 2 is a block diagram showing a computer device according to an embodiment of the invention. The computer device 200 includes a USB module 210, a controller 221, a central processing unit (CPU) 230, a chipset 240 and a power supply circuit 222. The CPU 230, the controller 221, the power supply circuit 222 and the chipset 240 are constructed on the motherboard 290. In the embodiment, the CPU 230 may be coupled to the chipset 240 and coupled to the USB module 210 via the chipset 240.

Generally speaking, the chipset 240 includes a north bridge chip 241 and a south bridge chip 242. The north bridge chip 241 may be coupled to the CPU 230, and the south bridge chip 242 may be coupled to the controller 221 besides the north bridge chip 241.

The controller 221 may be coupled to the USB module 210 via the USB B1. In addition, the power supply circuit 222 is directly connected to the USB module 210 via a power line PW. Thus, the power supply circuit 222 may supply operating power to the USB module 210 via the power line PW.

In addition, the USB module 210 includes a USB bridge 211 and a core circuit 212. The USB bridge 211 is coupled to the controller 221 and directly connected to the power supply circuit 222, and the core circuit 212 is coupled to the USB bridge 211 and directly connected to the power supply circuit 222. Herein, both the USB bridge 211 and the core circuit 212 receive the operating power generated by the power supply circuit 222 via the power line PW to operate using the operating power.

In the embodiment, the voltage level of the operating power provided by the power supply circuit 222 is exactly provided for the USB module 210 to use. Thus, the additional voltage regulators for meeting the different voltage levels (3.3 volts and 5 volts) regulated by the USBIF are not needed.

A built-in image capturer in the computer device is introduced in another embodiment to allow persons in the having ordinary skills in the art may know the invention.

Figure 3:
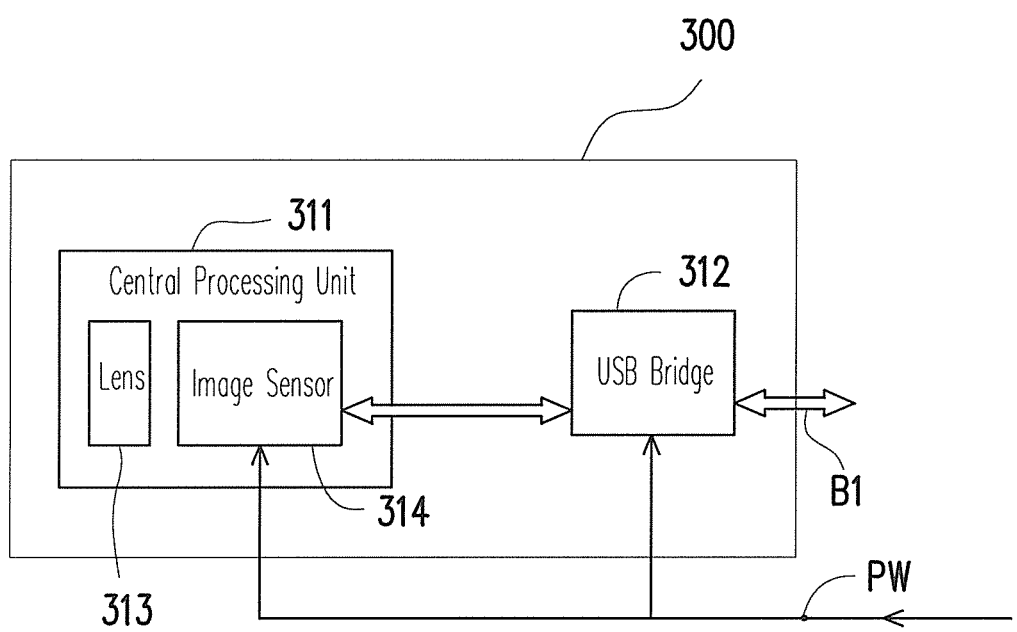
FIG. 3 is a block diagram showing an image capturer according to another embodiment of the invention.

FIG. 3 is a block diagram showing an image capturer according to another embodiment of the invention. The image capturer 300 may be a digital camera which may includes an image sensing module 311 and a USB bridge 312. The USB bridge 312 may be coupled to the image sensing module 311 and perform data access with, for example, the USB module 210 in FIG. 2 via the USB B1. In addition, the USB bridge 321 also receives operating voltage via the power line PW.

The image sensing module 311 includes a lens 313 and the image sensor 314. The image sensor 314 may be a CMOS sensor or a charge coupled device (CCD) sensor and may be disposed on the transmitting path of the light passing the lens 313. Thus, the image sensor 314 may capture the outside image via the lens 313 and generate image signals. The image signals may be transmitted to the USB bridge 312 via the image sensing module, and the USB bridge 312 may convert the format of the image signals to the USB format to transmit them via the USB B1.

To sum up, in the invention, since the built-in USB device does not need to conform to the regulation made by the USBIF that the power voltage should be 5 volts, a plurality of voltage regulators for converting the operating power in the conventional technology are not needed for the built-in USB device on the motherboard, and the output power provided by the power supply circuit originally set in the motherboard may be directly used to save the circuit cost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of.

What is claimed is:

1. A computer device comprising:
a controller for transmitting a data signal;
a power supply circuit for supplying operating power, wherein the power supply circuit for supplying multiple operating powers with different voltage levels to the computer device, and one of the multiple operating powers is directly supplying to an universal serial bus (USB) module via a power line without a voltage regulator; and
the USB module including:
a USB bridge coupled to the USB module, directly connected to the power supply circuit, used for transmitting the data signal and operating according to the operating power generated by the power supply circuit; and
a core circuit coupled to the USB module, directly connected to the power supply circuit and operating according to the operating power generated by the power supply circuit via the power line,
wherein the power supply circuit is a ATX power supply.

2. The computer device according to claim 1, further comprising:
a central processing unit (CPU); and
a chipset coupled between the CPU and the USB module and controlling the USB module.

3. The computer device according to claim 1, wherein the USB module comprise an image capturer.

4. The computer device according to claim 1, wherein the core circuit further comprises:
a lens; and
an image sensor, coupled to the lens, for capturing outside images via the lens.

5. An image capturer, adapted for a computer device, comprising:
a USB bridge, coupled to a USB, for transmitting a data signal;
a power line for directly receiving operating power from the computer device, wherein the operating power is one of multiple of operating powers generated from a power supply circuit, wherein the multiple of operating powers with different voltage levels are supplied to the computer device, the power supply circuit is a ATX power supply; and
an image sensing module, coupled to the USB bridge, for transmitting the data signal and receiving the operating power directly via the power line without a voltage regulator;
wherein the USB bridge and the image sensing module receive the operating power and operate according to the operating power.

6. The image capturer according to claim 5, wherein the USB bridge is used for converting the format of data signal to the USB format.

7. The image capturer according to claim 5, wherein the image sensing module comprises:
a lens; and
an image sensor, disposed on a transmitting path of light passing the lens, for capturing the outside images via the lens.

8. The image capturer according to claim 7, wherein the image sensor is a complementary metal oxide semiconductor (CMOS) sensor.

9. The image capturer according to claim 7, wherein the image sensor is a charge coupled device (CCD) sensor.

* * * * *